(12) United States Patent
Maskrot et al.

(10) Patent No.: US 8,690,995 B2
(45) Date of Patent: Apr. 8, 2014

(54) DEVICE FOR RECOVERING NANOPOWDERS AND ULTRAFINE POWDERS CONTAINED IN A GAS

(75) Inventors: Hicham Maskrot, Montlhery (FR); Benoit Guizard, Creteil (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 166 days.

(21) Appl. No.: 13/509,310

(22) PCT Filed: Nov. 17, 2010

(86) PCT No.: PCT/EP2010/067681
§ 371 (c)(1),
(2), (4) Date: May 11, 2012

(87) PCT Pub. No.: WO2011/061224
PCT Pub. Date: May 26, 2011

(65) Prior Publication Data
US 2012/0222558 A1    Sep. 6, 2012

(30) Foreign Application Priority Data

Nov. 19, 2009 (FR) ..................................... 09 58185

(51) Int. Cl.
*B03C 3/016* (2006.01)
(52) U.S. Cl.
USPC .............. 96/27; 96/53; 96/55; 96/68; 96/153; 96/154; 96/240; 96/242; 96/280; 96/332; 261/81; 261/DIG. 48
(58) Field of Classification Search
USPC ............. 96/27, 52, 53, 55, 68, 153, 154, 240, 96/242, 278, 280, 332; 977/773, 901; 261/81, DIG. 48
See application file for complete search history.

(56) References Cited

U.S. PATENT DOCUMENTS

| 4,181,509 | A | * | 1/1980 | Honacker et al. | 96/18 |
| 4,533,368 | A | * | 8/1985 | Snaddon et al. | 96/26 |

(Continued)

FOREIGN PATENT DOCUMENTS

| DE | 10 2004 049 850 A1 | 3/2006 |
| EP | 1 569 293 A1 | 8/2005 |
| JP | 52-74961 A * | 6/1977 |
| WO | WO 2007/068805 A1 | 6/2007 |

OTHER PUBLICATIONS

PCT International Preliminary Report on Patentability issued in International Application No. PCT/EP2010/067681 on Jul. 12, 2012 (with English translation).

(Continued)

*Primary Examiner* — Richard L Chiesa
(74) *Attorney, Agent, or Firm* — Oblon, Spivak, McClelland, Maier & Neustadt, L.L.P.

(57) ABSTRACT

A device for recovering nanometer or sub-micron particles carried by a gas by generating a stabilized suspension, including: a vessel including a mechanism injecting a liquid; a gas discharge mechanism in an upper portion thereof, located near a particle filter; a particle suspension outlet; and a liquid ring pump, transferring and dispersing particles carried by a gas into a liquid. The pump introduces a gas laden with nanometer or sub-micron particles into the pump; injects at least one liquid into the pump; and discharges the mixture obtained following the transfer. The vessel also includes a mechanism introducing the mixture into the vessel and at least one piezoelectric pellet, immersed in the vessel, configured to generate a fog of micron-sized droplets.

8 Claims, 2 Drawing Sheets

(56) References Cited

U.S. PATENT DOCUMENTS

Figure 1:
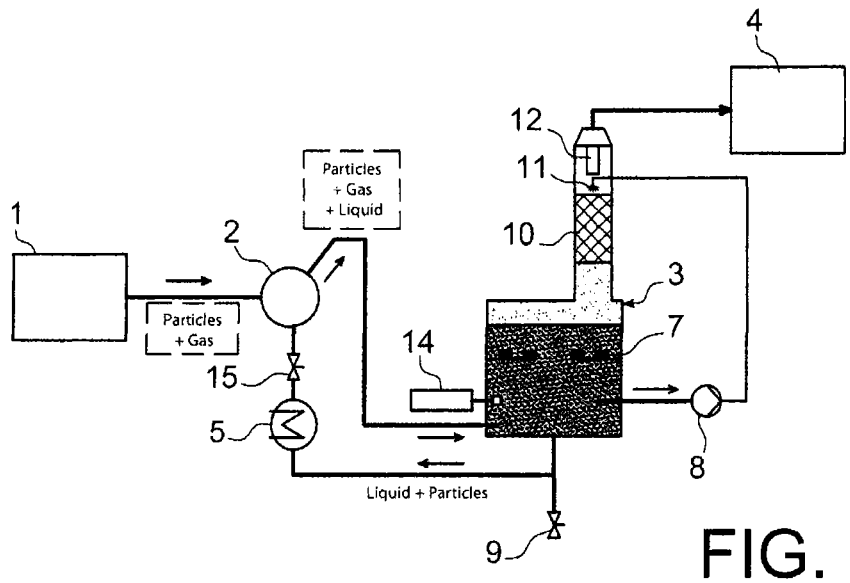

| | | | | |
|---|---|---|---|---|
| 4,654,054 | A | * | 3/1987 | Snaddon et al. .................. 96/68 |
| 4,900,527 | A | * | 2/1990 | Lierke ........................... 422/302 |
| 5,792,241 | A | * | 8/1998 | Browitt ............................. 96/52 |
| 5,922,103 | A | * | 7/1999 | Schwab et al. ...................... 95/8 |
| 6,235,088 | B1 | * | 5/2001 | Matsuura .......................... 96/53 |
| 6,357,726 | B1 | * | 3/2002 | Watkins .......................... 261/26 |
| 8,192,523 | B1 | * | 6/2012 | Kaufman et al. ................... 95/3 |
| 8,197,579 | B2 | * | 6/2012 | Miller .............................. 96/68 |
| 8,241,396 | B2 | * | 8/2012 | Ursem et al. ..................... 95/59 |
| 2007/0281188 | A1 | | 12/2007 | Bette et al. | 
| 2008/0305257 | A1 | | 12/2008 | Tenegal et al. |
| 2010/0011960 | A1 | * | 1/2010 | Lawrence ........................ 96/27 |

OTHER PUBLICATIONS

French Preliminary Search Report issued Jul. 21, 2010, in Patent Application No. FR 0958185 (with English Translation of Category of Cited Documents).

Von Karl Bisa, et al., "Zerstäubung von Flüssigkeiten mit Ultraschall", Siemens Zeitschrift, vol. 28, No. 8, Sep. 1954, pp. 341-347.

J. Spitz, et al., "La pulvé risation par ultra-sons appliquée à la spectrometrie d'absorption atomique", Applied Optics, vol. 7, No. 7, Jul. 1968, pp. 1345-1349.

* cited by examiner

DEVICE FOR RECOVERING NANOPOWDERS AND ULTRAFINE POWDERS CONTAINED IN A GAS

TECHNICAL FIELD

The invention relates to a device making it possible to recover nanometric particles (<100 nanometers), also known as nanoparticles or nanopowders, and sub-micron particles (100-500 nanometers), also known as particles or ultrafine powders, which could be contained in a gas.

For simplification reasons, in the remainder of the description and by way of example, nanoparticles will be considered.

PRIOR ART

On account of their specific properties, nanoparticles have been subject to increasing interest over the last few years. Nanoparticles are in fact used as raw material or as finished material in various industries, such as aeronautics (as nanocomposites), automobiles (in tyres, paints, catalysts), energy (nuclear or photovoltaic energy, petrochemicals), cosmetics (as structuring agents or UV barriers), microelectronics and agri-food.

The size of the particles is a factor that can strongly influence the toxicity thereof. Thus certain phases reputed to be inoffensive at the micrometric scale may become very toxic at the nanometric scale.

The development of nanoparticle production processes on an industrial scale, or simply the development of processes indirectly producing nanoparticles (the nanoparticles then being wastes that need to be confined and recovered), may thus prove to be dangerous if no precaution is taken to protect both the persons in charge of the units for the production, the handling and the integration of said nanoparticles, but also the environment.

It is thus necessary to properly control the recovery of the nanoparticles. To do this, there exist three types of nanoparticle recovery: recovery by dry processing, recovery by liquid processing and recovery by humid processing.

Devices for recovering nanoparticles by dry processing generally function with methods of manufacturing nanoparticles by gaseous processing (in other words processes in which the nanoparticles are produced in a gaseous flux). They generally include collectors with filtering barriers which stop the nanoparticles while allowing the process gases to escape. Cyclone devices or electrostatic devices can also be used.

In these dry processing recovery devices, the collection of the nanoparticles is carried out when the collectors are full in order to place the nanoparticles in bags or in containers.

Collection by dry processing presents a very high risk of exposure to the nanoparticles for the personnel responsible for this task. In fact, during the collection, the collectors are opened and, on account of the high volatility of the nanoparticles (often present in agglomerate form), they are placed in suspension instantly in the air and can thus be carried by the air to the routes of entry into the human body (nostrils, mouth, ears, etc.).

One way to ensure the protection of the personnel concerned consists in equipping them with integral overalls and respiratory devices having a suitable filtration capacity or functioning through input of air from an autonomous circuit.

But such equipment constitutes a significant extra cost (longer intervention times and purchase of overalls, filters, etc.). Moreover, on account of their volatility, said nanoparticles can deposit in different places in the installations if no measure is taken regarding their confinement. This constitutes an additional risk for the personnel in charge of cleaning the installations, but also for the environment (pollution of water, the air and the soil). Thus, the means of confinement to implement also constitute a significant extra cost in the design of the installations, but also in the operation thereof (replacement of filters, controls).

Liquid processing recovery devices consist for their part in placing the nanoparticles, present in a gas, in suspension in a liquid, to then recover said suspension.

Humid processing recovery operates on the same principle as liquid processing recovery, with the difference that instead of recovering a suspension, the suspension is filtered and the still humid particles present on the filter are recovered.

An example of a device for placing in suspension nanometric or submicronic particles is described in the document [1] referenced at the end of the description. In this device, the flux of particles to place in suspension is sent into a vessel containing a liquid. The suspension of particles in the liquid may be obtained by simple bubbling, by bringing the flux of particles directly into the liquid with a diffuser, constituted of a sleeve pierced by a multitude of holes. This particular design of diffuser makes it possible to maximise the exchange surface between the gaseous flux containing the particles and the liquid. The suspension of the particles in the liquid is obtained by vaporising the liquid in the gaseous flux.

Liquid processing or humid processing methods for recovering nanoparticles present fewer risks for personnel and the environment than the dry processing recovery method. However, known liquid processing or humid processing recovery devices, and particularly the device described in the document [1], are not very efficient in the case of mass production of nanoparticles (namely, when the gas flux comprises more than $12.10^4$ particles per litre per minute). In fact, the wettability of the nanoparticles is then not sufficient to enable good capture of all the particles by the liquid. A portion of the particles is thus found free in the gas and it then becomes necessary to purify the gas (for example using collectors with filtering barriers, etc.) so that the nanoparticles that it carries are not found in fine in the atmosphere. The confinement of said nanoparticles comprised in the gas leads to a significant extra cost (longer intervention times and purchase of filters).

The inventors have set themselves the aim of improving recovery by liquid or humid processing of particles of nanometric or sub-micron size comprised in a gaseous flux.

DESCRIPTION OF THE INVENTION

This aim is attained thanks to a device for recovering nanometer or sub-micron particles carried by a gas by generating stabilized suspensions of nanometer or sub-micron particles, said device including a vessel which comprises:
 means for injecting at least one liquid into the vessel,
 gas discharge means in the upper portion of the vessel after particle filtering means,
 particle suspension outlet means,
 characterised in that the device further comprises a liquid ring pump, intended to transfer and to disperse all or part of the nanometer or sub-micron particles carried by a gas in a liquid, the pump including:
 means for introducing a gas laden with nanometer or sub-micron particles into the pump,
 means for injecting at least one liquid into the pump and
 means for discharging a mixture comprising the liquid laden with particles and the gas obtained at the end of the transfer of particles,
 and characterised in that the vessel further comprises:
 means for introducing said mixture into the vessel and at least one electro-acoustic transducer of the piezoelectric pellet type, intended to be immersed within the vessel in a liquid, said transducer being designed such that the acoustic waves created at the level of said transducer propagate up to the surface of the liquid in which it is immersed and generate a fog of micron-sized droplets above the surface of said liquid.

The droplets have a micrometric size, in other words a diameter comprised between 1 and 1000 micrometers, or less (sub-micron). Preferably, the droplets have a size comprised between 0.3 and 10 micrometers.

The liquid in which is immersed said at least one transducer will usually be, at the start of the operation of the device, a non laden liquid that will be progressively laden with particles during the operation of the device.

According to the invention, the electro-acoustic transducers of the piezoelectric pellet type used emit ultrasonic waves at high frequencies (from 800 kHz to 3 MHz) and at high powers (more than 100 W).

According to a particular embodiment, the vessel is separated into two compartments, the liquid emerging into one of the compartments being able to pass into the other compartment by passing through a filter, said filter being designed to prevent the passage of the particles present in the liquid, the liquid after its passage through the filter serving to supply the means for injecting at least one liquid into the liquid ring pump and/or the means for injecting at least one liquid into the vessel.

Advantageously, the two compartments are situated one above the other.

Preferably, in this particular embodiment, said at least one transducer is positioned above the filter, while remaining below the level of the liquid/air interface. Preferably, the transducer is placed at a distance of around 10 cm below the liquid/air interface. For example, the volume of the compartment in which is placed said at least one transducer and the volume of liquid contained in said compartment are such that the transducer may be placed at around 30 cm above the filter, while being 10 cm below the liquid/air interface.

According to an embodiment, the means for introducing the mixture into the vessel are positioned so as to emerge above the liquid contained in the vessel in which said at least one transducer is immersed.

According to another embodiment, the means for introducing the mixture into the vessel are positioned so as to emerge into the liquid contained in the vessel in which said at least one transducer is immersed. Preferably, the means for introducing the mixture are positioned in such a way as to emerge into the vessel in a transversal manner with respect to the bottom of the compartment in which it is located or with respect to the filter. Preferably, the means for introducing the mixture are positioned below said at least one transducer. Preferably, the means for introducing the mixture are positioned as low as possible in the compartment in which they are located. In this embodiment, the means for introducing the mixture into the vessel advantageously include a diffuser constituted of a sleeve pierced by a multitude of holes.

Advantageously, the device further comprises means for introducing a liquid situated in the means for discharging the gases, after the filtering means.

Advantageously, the number of electro-acoustic transducer(s) of piezoelectric pellet type is one transducer per 400 mL of liquid laden with particles present above the transducer when the height of liquid above the transducer(s) is 10 cm. This value of one transducer per 400 mL of liquid is to be adapted as a function of the piezoelectric pellets chosen. For example, there exist pellets of Chinese manufacture (model M165D25 of the Pro-Wave brand) which operate in an optimal manner when they are immersed under a height of liquid of 45 mm and then produce 400 cc/h of droplets. The pellets of the Singceramics brand, model AW16Y20120F2 or AW16Y20120F2 (1.6 MHz and 2.4 MHz) can also be used.

BRIEF DESCRIPTION OF DRAWINGS

The invention will be better understood and other advantages and particularities will become clearer on reading the description that follows, given by way of non limiting example, accompanied by the appended figures, among which:

FIG. 1 represents a first example of a device for recovering particles according to the invention, the device operating in closed and/or semi-open circuit, without filtration;

FIG. 2 represents a second example of a device for recovering particles according to the invention, the device operating in closed and/or semi-open circuit, with tangential filtration;

FIG. 3 represents a third example of a device for recovering particles according to the invention, the device operating in closed and/or semi-open circuit, with frontal filtration.

FIG. 4 is a graph of the transmission measurements in the UV and the visible of suspensions Or solutions recovered in different spots of the recovery device according to the invention.

DETAILED DESCRIPTION OF PARTICULAR EMBODIMENTS

The recovery device according to the invention enables the direct recovery by liquid processing or by humid processing of important quantities of particles of nanometric or submicron size by optimising the placing in suspension of particles in a liquid.

In the device according to the invention, the placing in suspension of the particles is optimised by increasing the contact surface between the nanometer or sub-micron particles and the suspension liquid.

This optimisation is obtained, firstly, by making the flux of particles pass into a liquid ring pump (also known by the name of liquid ring vacuum pump or liquid ring compressor).

It will be recalled that a liquid ring pump comprises a cylindrical body (known as stator), in which turns a vaned rotor along a rotation axis off-centre with respect to the rotation axis of the stator, and two discs placed on either side of the stator, each including an opening (or port) through which the gas can penetrate (suction port) into the stator or escape (discharge port). The liquid ring pump further comprises a liquid inlet, a gas inlet and an outlet for the liquid and gas mixture. During operation, the liquid is pinned against the edges of the stator by the centrifugal force received from the vaned rotor and forms a ring concentric to the stator. The liquid within the stator thus makes it possible to ensure the sealing between the rotor and the stator. Since the rotor is off-centre, variable volume capacities are generated between two vanes and the liquid ring. When the rotor turns, a depression is created within the stator at the suction port and the gas is sucked up and mixed with the liquid (impaction phase), then, when it arrives at the discharge port, a compression is created and the compressed gas and the liquid are discharged to the exterior of the stator (compression phase).

In the device according to the invention, the liquid ring pump pumps, with controlled pressure, a flux of gas carrying particles out of a particle producing enclosure (synthesis reactor or effluent treatment unit, for example) and brings it into the stator. Then, the flux of gas carrying the particles enters into contact with the liquid ring, which acts as a liquid wall on which the particles are impacted. Thus, in the liquid ring pump, contact is forced between the particles and the liquid by compression/impaction cycles.

At the outlet of the liquid ring pump, the nanoparticles are for the most part in suspension in the liquid, but traces of particles can remain in the gas.

The optimisation of the placing in suspension of the particles is then obtained, secondly, by making the particles still present in the gas pass into a fog of microdroplets.

More precisely, the mixture obtained at the outlet of the liquid ring pump, including the gas and the liquid laden with nanoparticles, is sent into a vessel including at least one electro-acoustic transducer of the piezoelectric pellet type. The pellet(s) is(are) immersed in a liquid and make it possible to generate a dense fog of droplets of micrometric size or less into the vessel. Preferably, the size of the microdroplets is comprised between 0.3 and 10 micrometers.

The dimension of the droplets depends essentially on the frequency of the ultrasounds and the physical characteristics (surface tension and density) of the liquid in which are immersed the pellets (see the document [2]). For example, the sizes of the droplets are 0.3 µm, 1 to 2 µm, 4 to 5 µm and 6 to 8 µm respectively for vibration frequencies of 3 MHz, 2.1 Mhz, 1.3 MHz and 800 kHz.

The fog of droplets has the function of trapping the final nanoparticles not captured during the passage into the liquid ring pump and present in the gas. The finer the droplets and the denser the fog, the more efficient the capture of the nanoparticles. In fact, it is necessary to favour the probability of collision between a drop and a solid nanoparticle. This probability mainly depends on the mobility (speed) of the particles (liquid and gas) and the concentration of particles (density or quantity of drops).

The mixture including the gas and the laden liquid coming out of the liquid ring pump emerges either directly into the liquid present in the vessel (FIGS. 1, 2, 3) (a bubbling then occurs and the gas laden with traces of particles rises in the fog), or above the liquid, directly in the fog (not represented).

The use of piezoelectric pellets makes it possible to generate a homogeneous and dense fog: the size distribution of the droplets is in fact mono-dispersed and narrow. In this respect, it is possible to generate 216 cm$^3$/h of aerosol with a single pellet, arranged in 400 mL of liquid, without having to add an atomisation gas, which would have the effect of diluting the aerosol. The emission or the quantity of fog generated is going to depend on the ultrasonic power (in our case, it can attain 100 W). Thus, by adapting the number of piezoelectric pellets to the quantity of liquid present in the vessel, the fog obtained can cover the whole surface of the liquid, which is particularly important in the case where the mixture including the gas and the laden liquid emerge into the vessel directly in the liquid (bubbling).

The density of the fog depends on the height of liquid present above the pellets and the power of the ultrasounds. Preferably, the height of liquid is 10 cm. When static, in other words without carrier gas, the height of said fog is several centimeters (around 10 cm). By way of example, in ultrasonic spraying and with a pellet operating at 1 Mhz, it is possible to attain a density of the order of 18 mL per litre of gas, which is 14 times greater than that obtained by pneumatic spraying (see document [3]).

In order to increase the probability of contact between the droplets and the particles, it is possible to make the liquid aerosol (microdroplets) and solid aerosol (nanoparticles) mixture pass through a "coil" type system having a length of at least 1 meter and a diameter of the order of 10 mm. This coil has for other function to make the microdroplets laden with nanoparticles condense. The walls of the coil may optionally be cooled in order to improve the condensation on the surface thereof. The coil may for example be made of metal or ceramic.

Three embodiment variants of the device according to the invention will now be described. It is pointed out that identical elements in the different variants are designated by identical references.

In the three embodiment examples, the nanoparticles are produced by a gas phase synthesis process (laser pyrolysis, plasma, evaporation-condensation, combustion, etc.) in a synthesis reactor 1 for example. The flux of gas carrying the particles is conveyed into a liquid ring pump 2, which is supplied by a liquid, for example water. The flux of particles undergoes a phase of impaction and a phase of compression in the liquid ring pump and at the outlet of the pump is recovered a mixture including the gas, the particles and the liquid, the particles being mainly carried by the liquid.

This mixture is conveyed into a vessel 3 including a liquid, for example water, and optionally a dispersant, for example 1 mL of Dolapix PC21 from Zschimmer and Schwartz, and piezoelectric pellets 7 arranged in the vessel so as to be immersed in the liquid. For example, they are arranged 30 cm from the bottom of the vessel. Preferably, the volume of liquid comprised in the vessel is calculated so that the pellets are covered by around 10 cm of liquid (value calculated by taking as reference the pellets supplied by the company RBI (power from 0 to 100 W and frequency from 800 kHz to 3 MHz)).

The pellets are excited so as to form a fog of microdroplets above the liquid present in the vessel.

In these embodiment examples, the mixture from the liquid ring pump emerges into the liquid present in the vessel. A bubbling is produced when the gas escapes from the liquid and the gas is placed in contact with the microdroplets of the fog directly at the outlet of the liquid. In a variant, the mixture may emerge above the liquid.

To escape the vessel, the gas is obliged to pass through the fog.

Once it has traversed the fog, the gas is discharged from the vessel by passing through a system intended to separate the gas from the laden liquid.

This separation system here comprises a washing column provided with a condenser (not represented) and a multi staged filtration system 10 including at least two types of filters having different porosities chosen so as to separate the gas and the liquid. It is pointed out that the number of filters used depends on the level of safety that it is wished to establish. It is thus entirely possible to use more than two gas/laden liquid filters or separators.

The condenser enables the condensation of the microdroplets laden with nanoparticles. The condenser may for example be a coil. The first filter may be a "mist eliminator pad" made of stainless steel, ceramic or plastic. The droplets coalesce in the pad. The efficiency is going to depend on the load of the droplets, the thickness and the type of pad.

After its passage through the filtration system, the gas may optionally be washed by placing a rinse nozzle 11 at the outlet of the filtration system.

Then the gas optionally passes through filters that are going to make it possible to prevent any residue of nanoparticles leaving the enclosure with the outgoing gas. In this embodiment example and in the following, the filters placed at the column end are heated metal absolute filters 12. The heating makes it possible to avoid any condensation of non-laden liquid on the filters. In normal operation, no particle must be deposited on these final filters.

A heat exchanger 5 may be associated with the filtration system in order to limit the rise in temperature.

The device according to the invention may optionally be combined with a pumping system 4 facilitating the suction of the gases outside of the vessel.

The difference between the three embodiment examples is with regard to the vessel and the supply with liquid of the liquid ring pump.

According to a first embodiment example represented in FIG. 1, the vessel 3 is provided with a discharge situated in the bottom of the vessel and a viscometer 14 integrated in the vessel. As long as the viscosity of the suspension is below a threshold value, the suspension is discharged from the vessel and is redirected towards the liquid ring pump to supply said pump with liquid. The suspension that is discharged from the vessel can also serve to supply something other than the liquid ring pump; for example, in FIG. 1, the suspension that is discharged from the vessel also serves to supply the rinse nozzle 11; a pump 8 is used, for example a peristaltic pump, in order to pump the liquid present into the vessel and to supply the rinse nozzle 11. When the viscosity of the suspension reaches a fixed threshold, an extra liquid is injected into the circuit through a regulating valve 15 in order to maintain the viscosity of the suspension below the threshold value. In fact, the piezoelectric pellets and the liquid ring pump no longer work correctly when the viscosity of the suspension exceeds the threshold value. The threshold value will thus depend on the pellets used and the characteristics of the pump. The valve 9 makes it possible to recover the suspension during the experiment.

It is understood that the discharge speed of the suspension and the make up flow are adapted so that there is always liquid in the vessel when the device is in operation.

Furthermore, it is possible to use a heat exchanger 5 in order to limit the rise in temperature within the device.

According to a second and a third embodiment examples, the suspension present in the vessel is filtered before being sent back into the liquid ring pump to supply it with liquid or to supply the rinse nozzle 11.

Figure 2:
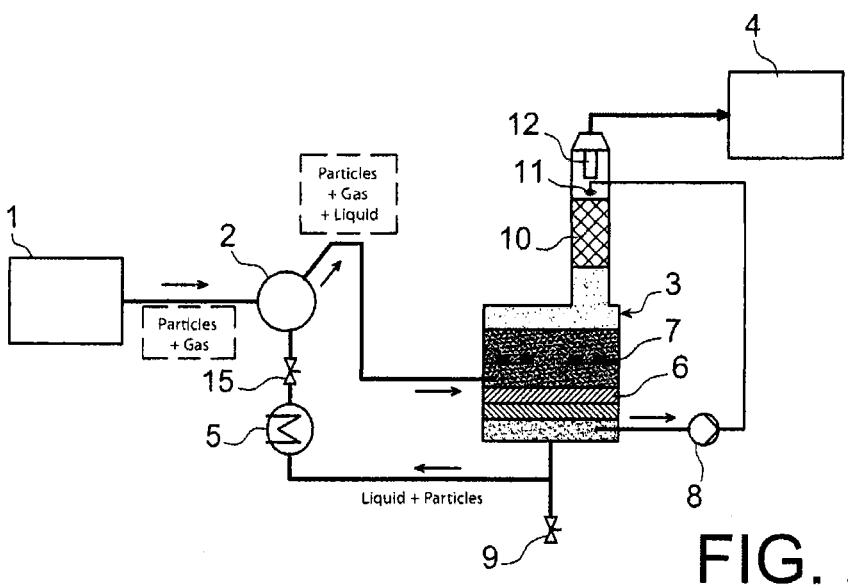
Figure 3:
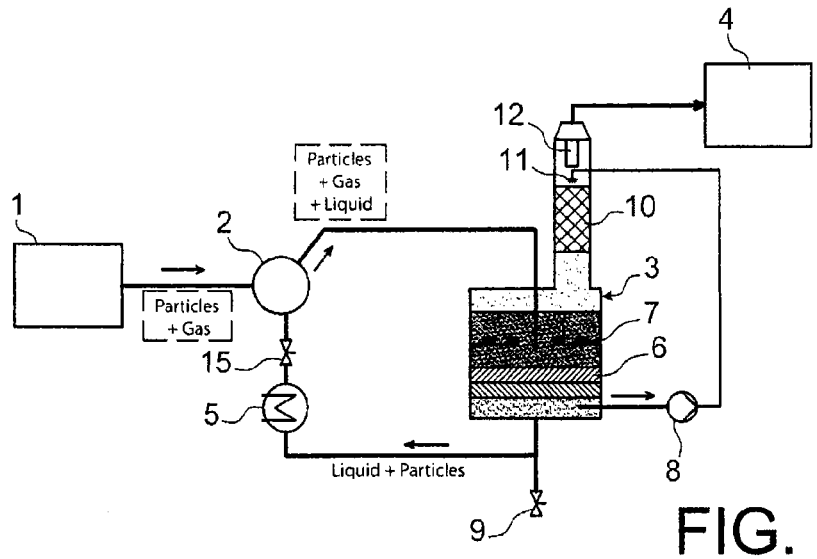
Figure 4:
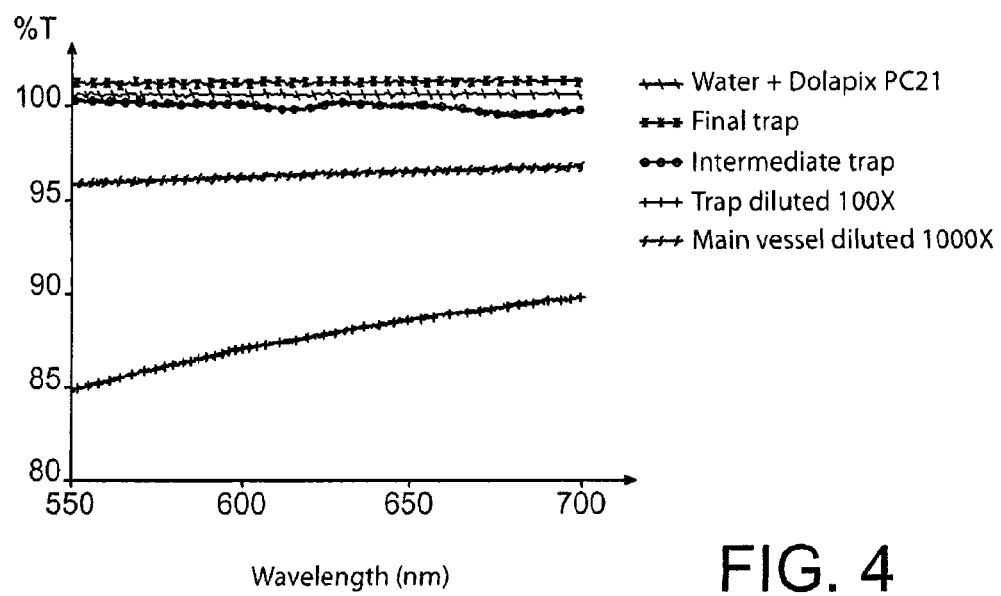

The vessel 3 may thus be provided with one or more filters 6 enabling the filtration of the suspension, as represented in FIGS. 2 and 3. The filtration of the suspension can be done in a tangential manner (FIG. 2) or in a frontal manner (FIG. 3).

In FIGS. 2 and 3, a filter divides the vessel 3 into two compartments situated one above the other, the piezoelectric pellets being arranged above the filter.

An example for recovering nanoparticles of SiC in a liquid medium (for example water and a dispersant) by means of generating a stabilized SiC suspension using the recovery device according to the invention will now be described.

For reasons of simplification, the device used operates in non filtered closed circuit (FIG. 1). The device thus comprises a liquid ring pump 2, a vessel 3 provided with piezoelectric pellets 7, a radiofrequency generator that makes it possible to make the piezoelectric pellets work and a condenser. Three traps that are going to play the role of the two filters of the filtering system used in FIG. 1 are added. The replacement of the two filters by three traps is carried out with a view to better visualizing the presence or the absence of nanoparticles at these different stages. It will be recalled that the number of filters used depends on the level of safety that it is wished to establish. The flux of nanoparticles is for example produced by a generator of nanometric powders, which is connected to the liquid ring pump.

To carry out the experiment, the operating conditions are as follows.

The generator of nanometric powders is parameterised so as to produce 75 g of nanoparticles of SiC having a diameter comprised between 35 nm and 37 nm according to a rhythm of 150 g/h of nanoparticles of SiC. The nanoparticles are carried by a vector gas, for example argon, and the flux thereby produced is injected into the liquid ring pump. The entrainment flow of the argon is here set at 25 L/min and the concentration of particles is for example 0.1 g of particles per litre of argon.

The liquid that is injected into the pump is for example a solvent composed of 4 litres of water and 1 mL of dispersant, for example Dolapix PC21. The addition of the dispersant makes it possible to improve the dispersion of the nanopowders in the suspension. The choice of the dispersant(s) is made as a function of the nature of the liquid and the powder forming the suspension. The dispersion may also be improved by stirring the suspension with a magnetic bar.

The vessel is a cylindrical enclosure of 8 cm diameter and 15 cm height. It comprises for example a solvent constituted of 4 L of water and 1 mL of dispersant. Under this volume of solvent are placed 10 piezoelectric pellets at equal distance to each other. In our embodiment example, the 10 pellets produce together more than 216 $cm^3$/h of liquid aerosol. The pellets are for example pellets of the company RBI (power from 0 to 100 W and frequency of 800 kHz to 3 MHz). The frequency of the pellets is here 800 kHz, i.e. a size of droplets comprised between 6 and 8 micrometers.

The laden gas and liquid mixture that comes out of the liquid ring pump is directed directly into the fog present in the vessel.

It is pointed out that the temperature in the vessel is 25° C. and the pressure is 999 mbar.

After around ten minutes of operation, it is observed that the solvent present in the vessel becomes laden with particles.

The particles present in the gas are snapped up by the droplets of the fog. The droplets condense on the walls of the condenser and the condensation of the droplets laden with nanopowders is then observed.

A portion of the laden droplets does not have the time to condense on the walls of the condenser and are trapped by the first filter (first trap), which here consists of an enclosure including a liquid and in which the gas is made to bubble. The water of the trap is clouded by the presence of nanopowders in suspension, unlike the following two traps (which are placed after the first trap), which remain limpid.

At the end of 30 minutes of operation, the 75 grammes of nanopowders of SiC have been injected continuously into the device.

FIG. 4 presents the transmission measurements in the UV and the visible of the suspensions or solutions recovered at the level of vessel 3 (diluted 1000 times) and each of the three traps (the solution recovered at the first trap being diluted 100 times before measuring its transmission), the transmission of the water+Dolapix PC21 mixture which is introduced into the liquid ring pump is also presented. The value of the transmission at 100% (+/−1) demonstrates the absence of particles in the second and the third traps (respectively the intermediate trap and the final trap). This result thus demonstrates the efficiency of the recovery device according to the invention.

By comparison, we carried out the same experiment by injecting 75 g of nanoparticles of SiC in argon according to a flow rate of 150 g/h into a device as described in the document [1] and which serves as reference device, namely a device comprising an identical cylindrical enclosure (same dimensions) to that used in our experiment, the flux of particles being sent into a solvent including 4 L of water and 1 mL of dispersant, for example Dolapix PC21, the particles being dispersed by an ultrasonic bar. The experimental conditions of flux and nature of vector gas are identical to those used in our experiment.

Whereas the presence of particles is observed in the three traps of the reference device and at the outlet of these traps (in other words in the atmosphere), no deposition of particles is detected in the second and third traps of the device according to the invention.

The particular design of the device according to the invention thus effectively makes it possible to recover more nanoparticles in the suspension on account of the fact that the wettability of the nanoparticles is improved by increasing the contact surface between the nanoparticles and the liquid. The placing in suspension of the particles during their mass production is thereby optimised.

The recovery device according to the invention has numerous advantages.

It makes it possible to trap in a very efficient manner nanoparticles from different processes or industrial installations.

In addition, the device according to the invention makes it possible to elaborate stable suspensions of nanoparticles, which is particularly appreciable given that the realisation of stabilized suspensions is particularly sought after. In fact, usually, the implementation or the packaging of nanopowders go through a step of placing in suspension nanoparticles in solvents and very varied formulations. The elaboration and the stabilisation of these suspensions is thus a key step in the implementation or the packaging of nanoparticles. For example, in mineral sun creams, the quality over time of the product is going to depend, among other things, on the good dispersion of the active phase (usually nanoparticles of titanium oxide $TiO_2$). Among the different processes of elaborating nanocomposites may be cited the electrophoretic infiltration (EPI) process. This requires the preparation of suspensions of nanoparticles which must have specific properties particularly in terms of stability, viscosity, mobility and concentrations of nanopowders. In certain cases, surface treatments of the nanopowders are necessary to place them in suspension. The optimisation of the suspensions of nanopowders is also primordial in microelectronic processes derived from printing or "ink jet" technologies such as "roll to roll", "microcontact printing" or "stamp printing" (printed circuit, photovoltaic cell ("nano-ink"), flat screens, etc.). Furthermore, the placing in suspension of nanopowders is a guarantee of work safety.

Once recovered, the suspension of nanoparticles may then be sent to a system of granulation (atomisation-drying or freeze-drying), to a system enabling the functionalisation of the nanoparticles (cold plasma for example) or instead to a characterisation device (granulometer, turbidimeter, viscometer, spectrometer, etc.).

BIBLIOGRAPHY

[1] WO 2007/068805 A1
[2] Bisa K. et al., "Zerstäubung von Flüssigkeiten mit Ultraschall", Siemens Z., 28 (8), p 341-347 (1954)
[3] J. Spitz et al., "La pulvérisation par ultra-sons appliquée à la spectrométric d'absorption atomique", Applied optics, 7 (7), p 1345-1349 (1968).

The invention claimed is:

1. A device for recovering nanometer or sub-micron particles carried by a gas by generating stabilized suspensions of nanometer or sub-micron particles, the device comprising a vessel which comprises:

means for injecting at least one liquid into the vessel;

gas discharge means located in an upper portion of the vessel after particle filtering means;

particle suspension outlet means;

a liquid ring pump, configured to transfer and disperse all or part of the nanometer or sub-micron particles carried by a gas in a liquid, the pump including:

means for introducing a gas laden with nanometer or sub-micron particles into the pump;

means for injecting at least one liquid into the pump; and means for discharging a mixture comprising the liquid laden with particles and the gas obtained at the end of the transfer of particles;

and wherein the vessel further comprises:

means for introducing the mixture into the vessel; and at least one electro-acoustic transducer having piezoelectric pellets, configured to be immersed within the vessel in a liquid, the transducer configured such that acoustic waves created at a level of the transducer propagate up to the surface of the liquid in which it is immersed and generate a fog of micron-sized droplets above the surface of the liquid.

2. The device of claim 1, wherein the vessel is separated into two compartments, the liquid emerging into one of the compartments being able to pass into the other compartment by passing through a filter, the filter being configured to prevent the passage of the particles present in the liquid, the liquid after its passage through the filter serving to supply the means for injecting at least one liquid into the liquid ring pump and/or the means for injecting at least one liquid into the vessel.

3. The device of claim 2, wherein the two compartments are situated one above the other.

4. The device of claim 2, wherein the at least one transducer is positioned on the filter.

5. The device of claim 1, wherein the means for introducing the mixture into the vessel is positioned to emerge above the liquid contained in the vessel in which the at least one transducer is immersed.

6. The device of claim 1, wherein the means for introducing the mixture into the vessel is positioned to emerge into the liquid contained in the vessel in which the at least one transducer is immersed.

7. The device of claim 6, wherein the means for introducing the mixture into the vessel includes a diffuser including a sleeve pierced by a multitude of holes.

8. The device of claim 1, further comprising means for introducing a liquid situated in the means for discharging the gases, after the particle filtering means.

* * * * *